(12) United States Patent
Mano

(10) Patent No.: US 7,088,164 B2
(45) Date of Patent: Aug. 8, 2006

(54) SEMICONDUCTOR INTEGRATED CIRCUIT DEVICE AND ELECTRONIC APPLIANCE WITH POWER CONTROL

(75) Inventor: Tatsuya Mano, Kyoto (JP)

(73) Assignee: Rohm CO, LTD, Kyoto (JP)

( * ) Notice: Subject to any disclaimer, the term of this patent is extended or adjusted under 35 U.S.C. 154(b) by 88 days.

(21) Appl. No.: 10/835,290

(22) Filed: Apr. 30, 2004

(65) Prior Publication Data

US 2004/0227555 A1 Nov. 18, 2004

(30) Foreign Application Priority Data

May 1, 2003 (JP) ............................. 2003-126356

(51) Int. Cl.
*H02M 3/24* (2006.01)
(52) U.S. Cl. ..................................... 327/291
(58) Field of Classification Search ................ 327/291, 327/295, 296
See application file for complete search history.

(56) References Cited

U.S. PATENT DOCUMENTS

| 5,530,515 | A | * | 6/1996 | Saegusa et al. | ............. | 396/246 |
| 5,892,942 | A | * | 4/1999 | Ohnishi et al. | ................. | 713/1 |
| 6,587,956 | B1 | * | 7/2003 | Hiratsuka et al. | ........... | 713/500 |
| 6,691,071 | B1 | * | 2/2004 | Kerr et al. | ................... | 702/188 |
| 2003/0071575 | A1 | * | 4/2003 | Kato | ....................... | 315/169.3 |

FOREIGN PATENT DOCUMENTS

| JP | 09-168241 | 6/1997 |
| JP | 2002-091610 | 3/2002 |
| JP | 2002-181971 | 6/2002 |

* cited by examiner

*Primary Examiner*—Terry D. Cunningham
*Assistant Examiner*—Thomas J. Hiltunen
(74) *Attorney, Agent, or Firm*—Arent Fox PLLC

(57) ABSTRACT

When main power is turned on by a switch SW, a pulse shaper 12 feeds a pulse signal having a pulse width Tp through an OR circuit 14 to a power supply circuit 2a to turn it on. Moreover, a delay generator 13a gives the pulse signal a delay and then feeds it to a control signal generator 15a so that a microcomputer 3 is turned on with a delay corresponding to the length of time required by the power supply circuit 2a to start up.

6 Claims, 2 Drawing Sheets

SEMICONDUCTOR INTEGRATED CIRCUIT DEVICE AND ELECTRONIC APPLIANCE WITH POWER CONTROL

This application is based on Japanese Patent Application No. 2003-126356 filed on May 1, 2003, the contents of which are hereby incorporated by reference.

BACKGROUND OF THE INVENTION

1. Field of the Invention

The present invention relates to an electronic appliance of any kind, and also relates to a semiconductor integrated circuit device provided with a power control function for turning on and off the power to such an electronic appliance. More particularly, the present invention relates to an electronic appliance such as a DSC (digital still camera) and a cellular phone, and also relates to a semiconductor integrated circuit device designed for use in such an electronic appliance and provided with a power control function for turning on and off the power to the electronic appliance.

2. Description of the Prior Art

Conventionally, many electronic appliances such as DSCs and cellular phones operate by being supplied with electric power from a direct-current power source. Such an electronic appliance that operates from a direct-current source is supplied with electric power from a battery, which may employ a secondary cell that is rechargeable for repeated use. Accordingly, there have been proposed many methods for reducing the power consumption in an electronic appliance for the purpose of prolonging the life of the battery that supplies the electronic appliance with electric power.

One conventionally proposed method relates to a receiver that, once brought into synchronism with a transmitter for communication, performs communication operations only during periods allocated to the receiver itself. This receiver operates by using a high-frequency clock signal only during the periods in which it performs communication operations, and operates by using a low-frequency clock signal in the periods in which it does not perform communication operations. This helps reduce power consumption. Another conventionally proposed method relates to a communication terminal that is so configured that, even when the power thereto is on, a low-rate clock signal is used and no clock signal is fed to the central processing unit except during reception.

In a communication appliance such as a cellular phone that performs communication operations only during the periods allocated thereto, the methods described above help reduce power consumption by keeping the central processing unit in a sleeping state during the periods in which no communication operations are performed and therefore the central processing unit does not need to operate. However, this is possible only in cases where, as described above, a communication apparatus operates in synchronism with another communication appliance and the periods in which no communication operations are performed can be accurately predicted. Accordingly, these methods are not used in electronic appliances such as DSCs, and, even if used, they offer no advantages.

In an electronic appliance as mentioned above, when the main power starts to be supplied thereto, to prevent failure, it is necessary that the microcomputer for controlling the individual blocks in the electronic appliance be first completely started up and then brought into an active state in which it can perform control operations. To achieve this, conventionally, the supply voltage is constantly monitored to check whether or not the main power is on so that, when the main power is turned on, the microcomputer is brought into the active state. Here, if the microcomputer needs to operate constantly to check whether or not the main power is on, it consumes power even when the main power is off, resulting in increased power consumption.

This can be overcome by bringing the microcomputer into the steady, active state only immediately after the main power is turned on, and this can be achieved by providing, as shown in FIG. 4, a voltage detection circuit 101 that checks whether or not the main power is on and a delay circuit 102 that adds a delay to the detection signal from the voltage detection circuit 101 to output a control signal for bringing a microcomputer 103 into an active state. Here, thanks to the voltage detection circuit 101 and the delay circuit 102, in a stand-by state with the main power off, only the voltage detection circuit 101 and the delay circuit 102 need to be kept on with the microcomputer 103 left off.

When the main power is turned on, the microcomputer 103 starts to be supplied with the main supply voltage and is thereby turned on. At this time, the voltage detection circuit 101 detects the main supply voltage and outputs a detection signal, and the delay circuit 102 adds a delay thereto and feeds it as a control signal to the microcomputer 103. In this way, the delay circuit 102 produces a delay long enough for the microcomputer 103 to start up completely after the supply voltage starts to be supplied thereto. This helps protect the microcomputer 103, and also helps reduce the power consumption in the stand-by state.

Inconveniently, however, an electronic appliance of which the starting-up is controlled as shown in FIG. 4 has the following disadvantages. To keep the voltage detection circuit 101 and the delay circuit 102 operating when the microcomputer 103 is not, the voltage detection circuit 101 and the delay circuit 102 need to be configured not as digital circuits but as analog circuits, which require a larger number of circuit elements and a larger mounting area (it should be noted that, in FIG. 4, the blocks corresponding to those identified with numerals 2a, 2b, and 4 to 7 in FIG. 1 are omitted). Moreover, the delay circuit 102 includes a capacitor, to which an increasingly high capacitance needs to be given as an increasingly long delay is required. This further increases the mounting area. That is, configuring the voltage detection circuit 101 and the delay circuit 102 as analog circuits helps reduce the power consumption in a stand-by state before the power is turned on, but only at the cost of increasing the size of the device

SUMMARY OF THE INVENTION

An object of the present invention is to provide a semiconductor integrated circuit device that, despite being composed totally of digital circuits, permits a control signal to be fed to another block in an electronic appliance with a delay relative to the time point at which the main power is recognized to be turned on.

To achieve the above object, according to one aspect of the present invention, a semiconductor integrated circuit device is provided with: a clock generator that generates a clock signal for time-keeping even when main power to an electronic appliance is off; a drive control signal generator that generates a drive control signal by which is driven a power supply circuit that supplies a supply voltage to a main controller that controls the electronic appliance as a whole; a state control signal generator that generates a state control signal by which is controlled the operation state of the main controller; and a timing controller that controls the operation timing of the remaining part of the electronic appliance other than the main controller. Here, the drive control signal generator, the state control signal generator, and the timing controller are logic circuits that operate based on the clock signal from the clock generator. Moreover, whether the main power to the electronic appliance is on or off is checked so that, based on whether the main power is on or off, the supply of electric power to individual blocks of the electronic appliance is controlled.

According to another aspect of the present invention, an electronic appliance is provided with: main power that turns on and off the electronic appliance; a clock generator that generates a clock signal that permits the electronic appliance to operate; and a time-keeping circuit that keeps time. Here, when the main power is on, the entire electronic appliance operates by using a high-frequency main clock signal from the clock generator and, when the main power is off, only the time-keeping circuit operates by using a low-frequency sub clock for time-keeping from the clock generator. Moreover, an operation for taking in an input signal is performed by using the sub clock after the main power is turned from off to on until a high-speed operation is started.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
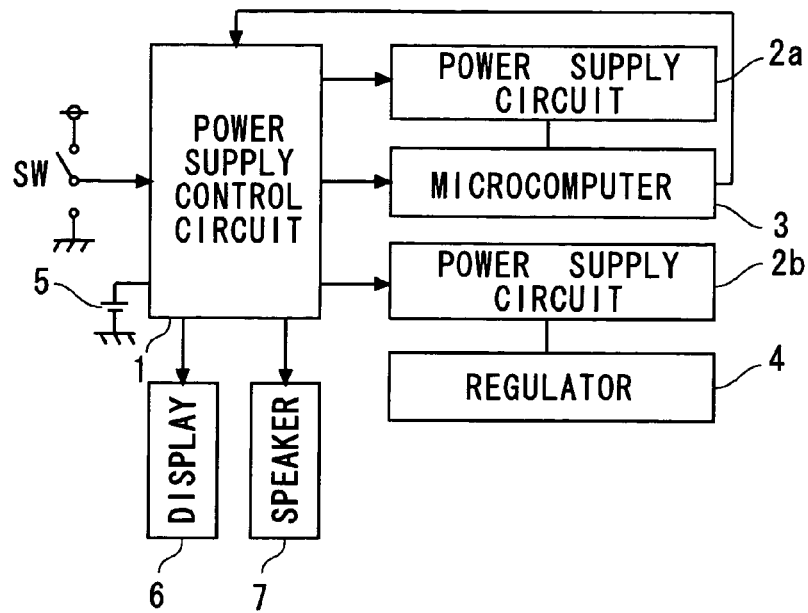
FIG. 1 is a block diagram showing the internal configuration of an electronic appliance provided with a power supply control circuit according to the invention.

Hereinafter, an embodiment of the present invention will be described with reference to the drawings. FIG. 1 is a block diagram showing the internal configuration of an electronic appliance provided with a power supply control circuit embodying the invention.

The electronic appliance shown in FIG. 1 is provided with: a switch SW that turns the power on and off; a power supply control circuit 1 that monitors the operation of the switch SW; power supply circuits 2a and 2b that are turned on and off by the power supply circuit 1 and that supply voltages VCC1 and VCC2, respectively; a microcomputer 3 that operates from the supply voltage VCC1 to control the electronic appliance as a whole; a regulator 4 that generates power to be supplied to other functional blocks; a backup battery 5 that supplies power to the power supply control circuit 1; a display 6 such as an LED (light-emitting diode) or LCD (liquid crystal display); and a speaker 7 that outputs sounds.

Figure 2:
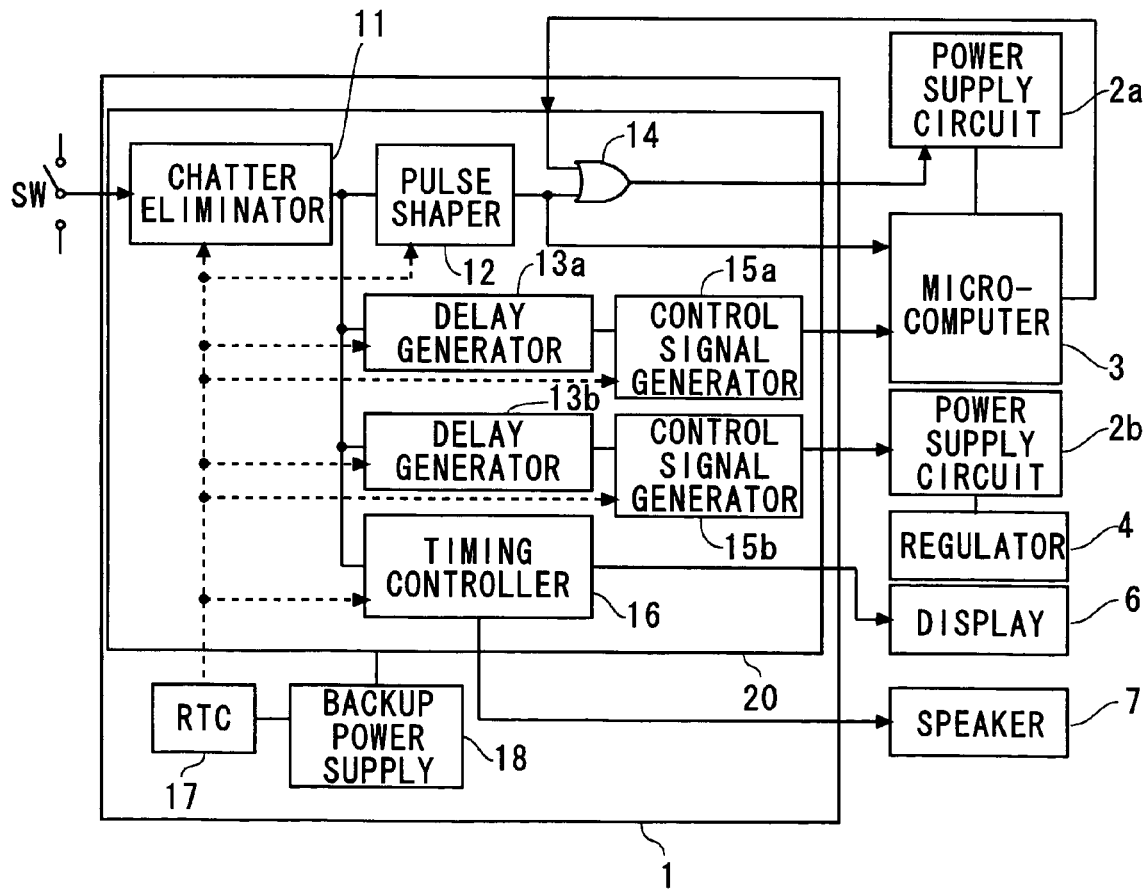
FIG. 2 is a block diagram showing the internal configuration of a power supply control circuit according to the invention.

As shown in FIG. 2, the power supply control circuit 1 is provided with: a chatter eliminator 11 that eliminates the chatter that accompanies the pulse generated when the switch SW is turned on or off; a pulse shaper 12 that shapes the pulse generated when the switch SW is turned on or off and then having chatter eliminated therefrom by the chatter eliminator 11 into a pulse having a predetermined pulse width, and that then outputs the thus shaped pulse; delay generators 13a and 13b that each give a delay to the pulse generated when the switch SW is turned on or off and then having chatter eliminated therefrom by the chatter eliminator 11; an OR gate 14 that receives the pulse signal from the pulse shaper 12 along with a signal (hereinafter referred to as the "start-up completion indicating signal") that indicates the completion of the start-up of the microcomputer 3; control signal generators 15a and 15b that operate the microcomputer 3 and the power supply circuit 2b according to the pulse signals from the delay generators 13a and 13b; a timing controller 16 that controls, according to the pulse signal from the chatter eliminator 11, the timing with which to start various operations such as screen display and sound output; an RTC (real-time clock) 17 that feeds a low-frequency clock signal to the individual blocks of the power supply control circuit 1; and a backup power supply 18 that rectifies the voltage from a backup battery 5.

In FIG. 2, the chatter eliminator 11, the pulse shaper 12, the delay generators 13a and 13b, the OR gate 14, the control signal generators 15a and 15b, and the timing controller 16 together constitute a power control block 20. In FIG. 2, the backup power supply 18 is illustrated as supplying a voltage to the power control block 20, and this should be understood as signifying that the voltage from the backup power supply 18 is supplied to the individual blocks constituting the power control block 20.

The voltage from the backup power supply 18 is also supplied to the RTC 17. Thus, the voltage from the backup battery 5 is rectified by the backup power supply 18, and is then supplied to the chatter eliminator 11, the pulse shaper 12, the delay generators 13a and 13b, the OR gate 14, the control signal generators 15a and 15b, the timing controller 16, and the RTC 17.

The clock signal outputted from the RTC 17 is fed to each of the chatter eliminator 11, the pulse shaper 12, the delay generators 13a and 13b, the control signal generators 15a and 15b, and the timing controller 16. Thus, the eliminator 11, the pulse shaper 12, the delay generators 13a and 13b, the control signal generators 15a and 15b, and the timing controller 16 each operate in synchronism with the low-speed clock signal outputted from the RTC 17.

The outputs from the OR gate 14 and the control signal generator 15b serve as drive control signals for turning on the power supply circuits 2a and 2b, respectively. The output from the control signal generator 15a serves as a state control signal for bringing the microcomputer 3 into an active state. The timing controller 16 generates control signals that cause the display 6 to perform display and the speaker 7 to output sounds, and outputs those control signals to the display 6 and the speaker 7 according to the operation timing thereof. The power supply control circuit 1 configured as described above is built as a one-chip semiconductor integrated circuit device.

Now, the operation of the electronic appliance provided with the power supply control circuit 1 configured as described above will be described with reference to the timing charts shown in FIGS. 3A to 3I. FIGS. 3A to 3I are timing charts showing the output waveforms of the individual blocks provided within the power supply control circuit 1. Here, the switch SW is assumed to be a slide switch that, when operated, immediately returns to its original state.

Figure 3A:
FIGS. 3A to 3I are timing charts showing the signal waveforms observed at relevant points in the power supply control circuit shown in FIG. 2.
Figure 3B:

In a state where the main power to the electronic appliance is off, operating the switch SW serves as giving an instruction to turn the main power on. This causes a pulse signal to be fed from the switch SW to the power supply control circuit 1. The pulse signal from the switch SW is, as a signal accompanied by chatter as shown in FIG. 3A, fed to the chatter eliminator 11, which then eliminates the chatter, which behaves as noise, so as to output a pulse signal as shown in FIG. 3B. That is, the pulse signal having chatter eliminated therefrom by the chatter eliminator 11 is dealt with as the pulse signal generated as the result of the switch SW being operated.

Figure 3C:
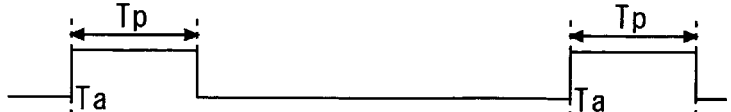

The pulse signal thus having chatter eliminated therefrom is fed to the pulse shaper 12 and to the delay generators 13a and 13b. The pulse shaper 12 converts the pulse signal fed from the chatter eliminator 11 into a pulse signal having a pulse width Tp as shown in FIG. 3C, and then outputs this pulse signal. The pulse signal from the pulse shaper 12 is, as a drive control signal, fed through the OR gate 14 to the power supply circuit 2a. This turns the power supply circuit 2a on, and thus cases the supply voltage VCC1 to start to be supplied to the microcomputer 3.

Figure 3D:
Figure 3E:
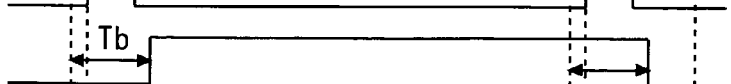
Figure 3F:
Figure 3G:
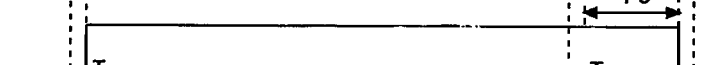

The delay generator 13a gives a delay of a length of time Ta to the pulse signal from the chatter eliminator 11 as shown in FIG. 3D. This delay time Ta is so set as to be longer than the length of time required after the power supply circuit 2a starts to operate until the supply voltage VCC1 rises to a sufficient level. When the pulse signal thus delayed by the delay time Ta is fed to the control signal generator 15a, the state control signal outputted from the control signal generator 15a turns high as shown in FIG. 3G, and thus causes the microcomputer 3 to be brought into an active state. That is, after the power supply circuit 2a is driven with the drive control signal, the lapse of the length of time Ta permits the supply voltage VCC1 to rise to a sufficient level; thereafter, the state control signal is turned high to bring the microcomputer 3 into an active state so that the microcomputer 3 begins to start up.

After the microcomputer 3 is supplied with the supply voltage VCC1 from the power supply circuit 2a and starts to perform its start-up operations including the resetting of itself, when a length of time Tb elapses after the power supply circuit 2a starts its start-up operations, the microcomputer 3 is brought into an active state, and thus completes its start-up operations. At this time, the microcomputer 3 generates a start-up completion indicating signal that indicates that the microcomputer 3 has completely started up, and outputs it to the power supply control circuit 1. As shown in FIG. 3E, this start-up completion indicating signal turns from low to high when the microcomputer 3 is brought into an active state on completion of starting-up. On the other hand, the pulse signal outputted from the pulse shaper 12 is so set that its pulse width Tp and the length of time Tb required until the completion of the starting-up of the microcomputer 3 fulfils the relation Tp>Tb.

Thus, the OR gate 14, after receiving the pulse signal from the pulse shaper 12, receives the start-up completion indicating signal, which turns high while that pulse signal is present. As a result, after the main power is turned on, and then the pulse signal from the pulse shaper 12 is fed to the OR gate 14, the drive control signal outputted from the OR gate 14 is kept high as shown in FIG. 3F, and thus the power supply circuit 2a is kept on.

Figure 3H:
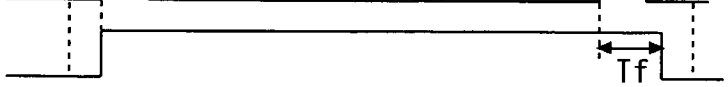
Figure 3I:
Figure 4:
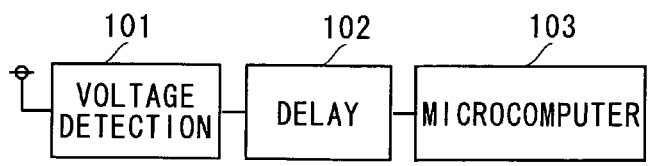
FIG. 4 is a block diagram showing the internal configuration of a conventional electronic appliance of which the starting-up is controlled.

The delay generator 13b gives a delay of a length of time Tc to the pulse signal from the chatter eliminator 11 as shown in FIG. 3H. This delay time Tc is so set as to be longer than the delay time Ta. When the pulse signal thus delayed by the delay time Tc is fed to the control signal generator 15b, the drive control signal outputted from the control signal generator 15b turns high as shown in FIG. 3I, and thus causes the power supply circuit 2b to be turned on. That is, after a high level is fed as the state control signal from the control signal generator 15a to the microcomputer 3, and then a high level is fed as the drive control signal from the control signal generator 15b to the power supply circuit 2b, the power supply circuit 2b starts up. Then, the power supply circuit 2b feeds the supply voltage VCC2 to the regulator 4.

While the start-up operations of the microcomputer 3 and of the regulator 4 are being performed as described above, when the microcomputer 3 is recognized as having started up, the timing controller 16 outputs control signals to the display 6 and the speaker 7 to make the display 6 and the speaker 7 operate with predetermined timing. That is, when the microcomputer 3 has started up, and thus the electronic appliance as a whole is brought into a controllable state, the timing controller 16 outputs control signals with predetermined timing to make the display 6 and the speaker 7 operate.

Through the sequence of operations described above, the microcomputer 3, the regulator 4, and other blocks are supplied with supply voltages, and the electronic appliance is turned on. Now, according to the operations performed by the user, the microcomputer 3 feeds control signals to the individual blocks to control their operation. Thereafter, when the switch SW is so operated as to turn the main power off, the pulse signal generated by the switch SW and accompanied by chatter is fed to the power supply control circuit 1.

When this pulse signal accompanied by chatter is fed to the power supply control circuit 1, the pulse signal first has the chatter eliminated therefrom by the chatter eliminator 11, and is then fed to the pulse shaper 12, to the delay generators 13a and 13b, and to the microcomputer 3. On receiving the pulse signal generated by the switch SW and then having chatter eliminated therefrom, the microcomputer 3 recognizes that an instruction to turn the main power off is given, and thus begins to shut itself down.

After the microcomputer 3 recognizes the pulse signal from the pulse shaper 12, when a length of time Td elapses, the microcomputer 3 completes its shutting-down, and thus the start-up indicating signal turns low a shown in FIG. 3E. Moreover, since the pulse signal from the chatter eliminator 11 is fed also to the pulse shaper 12, the pulse shaper 12 outputs a pulse signal having a pulse width Tp. Thus, after the lapse of the length of time Td after the microcomputer 3 recognizes the pulse signal from the chatter eliminator 11, only the pulse signal from the pulse shaper 12 is fed to the OR gate 14.

Moreover, the pulse signal from the chatter eliminator 11 is fed also to the delay generators 13a and 13b, and thus the delay generators 13a and 13b delay the pulse signal by lengths of time Ta and Tc, respectively, and then output them to the control signal generators 15a and 15b. Then, the control signal generator 15a turns the state control signal low when a length of time Te elapses after the rise of the pulse signal fed thereto, and the control signal generator 15b turns the state control signal low when a length of time Tf elapses after the rise of the pulse signal fed thereto. Here, the length of times Ta and Tc to Tf and the pulse width Tp fulfill the relationship Td<Tc+Tf<Ta+Te<Tp.

Accordingly, after the rise of the pulse signal from the chatter eliminator 11, when the length of time Tc+Tf elapses, the drive control signal outputted from the control signal generator 15b, to which the pulse signal delayed by the length of time Tc is fed, turns low, and thus turns the power supply circuit 2b off. This causes the power supply circuit 2b to stop the supply of electric power to the regulator 4, and thus the regulator 4 stops operating.

When the length of time Ta+Te−(Tc+Tf) elapses, the state control signal outputted from the control signal generator 15a, to which the pulse signal delayed by the length of time Ta is fed, turns low, and thus brings into a non-active state the microcomputer 3, which has shut down after the lapse of the length of time Td after the rise of the pulse signal from the chatter eliminator 11. Thereafter, the pulse signal from the pulse shaper 12 turns low, and this causes the drive control signal outputted from the OR gate 14, to which only the pulse signal from the pulse shaper 12 is now fed, turns low, and thus turns the power supply circuit 2a off. This causes the power supply circuit 2a to stop the supply of electric power to the microcomputer 3, and thus the microcomputer 3 completely stops operating.

In the sequence of operations described above, the chatter eliminator 11 eliminates chatter by sampling the signal from the switch SW on the basis of the clock signal from the RTC 17. Also performed on the basis of the clock signal from the RTC 17 are the checking of the pulse width Tp by the pulse shaper 12, the checking of the delay times Ta and Tc by the delay generators 13a and 13b, the checking of the lengths of time Te and Tf by the control signal generators 15a and 15b, and the checking of the output timing of the control signals by the timing controller 16.

As a result of the power supply control circuit 1 operating as described above in this embodiment, when the main power is off, only the power supply control circuit 1 is made to operate according to the RTC 17, of which the power consumption is low, and the other circuit blocks such as the microcomputer 3 are kept stopped. This helps reduce the power consumption by the electronic appliance as a whole. Moreover, the microcomputer 3 can be so controlled as to be brought into an active state after the supply voltage fed thereto has risen completely. This makes it possible to protect the microcomputer 3 so that no abnormal voltage load is applied thereto.

Moreover, the provision of the RTC 17 in the power supply control circuit 1 permits the individual blocks within the power supply control circuit 1 to be built as logic circuits. In particular, the delay generators 13a and 13b do not need to be built as analog circuits employing a capacitor, and this helps reduce the number of components used therein. Thus, in the power supply control circuit 1, which is built as a one-chip semiconductor integrated circuit device, by reducing the mounting areas of the individual blocks, it is possible to reduce the size of the power supply control circuit 1 and to reduce the current that it consumes.

In this embodiment, control is so performed that the regulator 4 is supplied with electric power after the microcomputer 3 is brought into an active state until the start-up completion signal turns high and the supply of electric power to the regulator 4 is stopped after the start-up completion signal turns low until the microcomputer 3 is brought into a non-active state. The sequence of operations for this control, however, does not necessarily have to be strictly the same as the one used in the embodiment described above; that is, those operations may be performed in a different order. In that case, as described above, the order in which the individual blocks of the electronic appliance should operate is set by the power supply control circuit 1 according to the pulse signal outputted from the chatter eliminator 11 and the clock signal from the RTC 17.

By the use of a semiconductor integrated circuit device according to the present invention, when the main power to an electronic appliance is off, it is possible to turn only the semiconductor integrated circuit device on while keeping other devices off. This helps reduce power consumption. Moreover, by operating the semiconductor integrated circuit device with a low-speed clock signal, it is possible to reduce the current consumed by the semiconductor integrated circuit device. Moreover, building the semiconductor integrated circuit device as logic circuits helps reduce the number of components used therein, and thus helps reduce the mounting area occupied thereby.

What is claimed is:

1. A semiconductor integrated circuit device comprising:
   a clock generator that generates a clock signal for timekeeping even when main power to an electronic appliance is off;
   a drive control signal generator that generates a drive control signal for controlling a power supply circuit that supplies a supply voltage to a main controller that controls the electronic appliance as a whole;
   a state control signal generator that generates a state control signal for controlling an operation state of the main controller; and
   a timing controller that controls operation timing of a remaining part of the electronic appliance other than the main controller,
   wherein the drive control signal generator, the state control signal generator, and the timing controller are logic circuits that operate based on the clock signal from the clock generator, and
   wherein, when the main power to the electronic appliance is detected to be on, electric power is supplied to individual blocks of the electronic appliance and, when the main power to the electronic appliance is detected to be off, electric power is not supplied to the individual blocks of the electronic appliance.

2. A semiconductor integrated circuit device as claimed in claim 1,
   wherein, a predetermined length of time after the drive control signal generator outputs the drive control signal, the state control signal generator outputs the state control signal.

3. A semiconductor integrated circuit device as claimed in claim 1,
   wherein the clock generator generates the clock signal with a frequency lower than a clock frequency used when the main power to the electronic appliance is on, and the clock generator is constantly operating.

4. A semiconductor integrated circuit device as claimed in claim 1,
   wherein the drive control signal generator comprises:
      a pulse shaper that generates, from a first pulse signal indicating turning-on and turning-off of the main power to the electronic appliance, a second pulse signal having a pulse length longer than a length of time that the main controller requires to start up and shut down; and
      an OR gate that receives a start-up completion indicating signal indicating starting-up and shutting-down of the main controller along with the second pulse signal from the pulse shaper to output the drive control signal to the main controller.

5. A semiconductor integrated circuit device as claimed in claim 4, wherein the state control signal generator comprises:

a delay generator that gives the first pulse signal indicating the turning-on and turning-off of the main power to the electronic appliance a delay longer than a length of time required by the power supply circuit that supplies the main controller to start up.

6. A semiconductor integrated circuit device as claimed in claim 5, further comprising:

a chatter eliminator that eliminates chatter from the first pulse signal indicating the turning-on and turning-off of the main power to the electronic appliance, wherein the first pulse signal having chatter eliminated therefrom is fed to the pulse shaper and to the delay generator.

* * * * *